(12) United States Patent
Cutler et al.

(10) Patent No.: US 8,694,629 B2
(45) Date of Patent: Apr. 8, 2014

(54) HIERARCHICAL METERING POLICY ATTRIBUTES

(75) Inventors: Kevin Scott Cutler, Carp (CA); Allen Robinson, Ottawa (CA); Fan Mo, Ottawa (CA); Richard Anthony Brunet, Ottawa (CA); Hamdy Farid, Kanata (CA)

(73) Assignee: Alcatel Lucent, Paris (FR)

( * ) Notice: Subject to any disclaimer, the term of this patent is extended or adjusted under 35 U.S.C. 154(b) by 74 days.

(21) Appl. No.: 13/251,709

(22) Filed: Oct. 3, 2011

(65) Prior Publication Data

US 2013/0086253 A1  Apr. 4, 2013

(51) Int. Cl.
*G06F 15/173* (2006.01)

(52) U.S. Cl.
USPC .......................... 709/224; 455/405; 709/223

(58) Field of Classification Search
USPC .......................... 709/223, 224; 455/405–406
See application file for complete search history.

(56) References Cited

U.S. PATENT DOCUMENTS

| 7,937,300 | B2 * | 5/2011 | Foottit et al. .................... 705/30 |
| 8,175,576 | B2 * | 5/2012 | Przybysz et al. .............. 455/406 |
| 8,295,170 | B2 * | 10/2012 | Cuervo .......................... 370/230 |
| 8,345,676 | B2 * | 1/2013 | Lialiamou et al. ............ 370/389 |
| 2006/0072595 | A1 * | 4/2006 | Broberg et al. ................ 370/410 |
| 2007/0150936 | A1 * | 6/2007 | Maes ................................. 726/1 |
| 2008/0271113 | A1 * | 10/2008 | Belling ............................ 726/1 |
| 2009/0228956 | A1 * | 9/2009 | He et al. ............................ 726/1 |
| 2011/0044353 | A1 * | 2/2011 | Foottit et al. .................. 370/465 |
| 2011/0131338 | A1 * | 6/2011 | Hu ................................. 709/229 |
| 2011/0208853 | A1 * | 8/2011 | Castro-Castro et al. ...... 709/223 |
| 2011/0286384 | A1 * | 11/2011 | Sugimoto et al. ............. 370/328 |
| 2012/0210003 | A1 * | 8/2012 | Castro et al. .................. 709/225 |
| 2012/0297076 | A1 * | 11/2012 | Wu et al. ........................ 709/227 |
| 2012/0324091 | A9 * | 12/2012 | Raleigh et al. ................ 709/224 |
| 2012/0331421 | A1 * | 12/2012 | Mohammed et al. ......... 715/841 |

* cited by examiner

*Primary Examiner* — Patrice Winder
*Assistant Examiner* — Eyob Hagos
(74) *Attorney, Agent, or Firm* — Kramer + Amado, P.C.

(57) ABSTRACT

Various exemplary embodiments relate to a method performed by a policy and charging rules node for managing usage of a subscriber. The method may include: defining a primary metering policy having a first applicability condition and a first quota; defining a secondary metering policy having attributes including a second applicability condition and at least one inherited attribute that references an attribute of the primary metering policy; determining that the second metering policy is applicable when the first applicability condition and the second applicability condition are true; selecting the secondary metering policy as an active metering policy; and managing subscriber usage according to the attributes of the secondary metering policy. In various alternative embodiments, the step of managing subscriber usage includes: measuring subscriber usage according to a rating factor of the secondary metering policy; and charging the measured subscriber usage to both the primary metering policy and the secondary metering policy.

18 Claims, 8 Drawing Sheets

| METERING POLICY | |
|---|---|
| ATTRIBUTES | |
| NAME | 4G DATA |
| POLICY TYPE | BASIC METERING POLICY |
| PRIORITY | 10 |
| QUOTA TYPE | TOTAL |
| QUOTA | 2GB |
| RECURRENCE | MONTHLY |
| VALIDITY PERIOD | N/A |
| OVERAGE | YES |

| APPLICABILITY RULES | |
|---|---|
| CONDITION | ACTION |
| ACCESS=4G | ACTION=4G DATA |

| RATING RULES | |
|---|---|
| CONDITION | ACTION |
| LOCAL | RATING=1 |
| ROAMING | RATING=2 |
| INTERNATIONAL | RATING=5 |

| THRESHOLD RULES | |
|---|---|
| CONDITION | ACTION |
| 100% THRESHOLD | ACTION=TERMINATE |
| 90% THRESHOLD | ACTION=DOWNGRADE |
| 50% THRESHOLD | ACTION=NOTIFY |
| 0% THRESHOLD | ACTION=NOTIFY |

FIG. 3

| METERING POLICY | | |
|---|---|---|
| 410 | ATTRIBUTES | |
| 411 | NAME | ALL DATA |
| 412 | POLICY TYPE | VIRTUAL METERING POLICY |
| 413 | PRIORITY | 3 |
| 414 | QUOTA TYPE | TOTAL |
| 415 | QUOTA | APPLICABLE METERING POLICIES |
| 416 | RECURRENCE | MONTHLY |

| 420 | APPLICABILITY RULES | |
|---|---|---|
| 422 | CONDITION | ACTION |
| 426 | ACCESS=DATA? | ACTION=ALL DATA |

| 430 | RATING RULES | |
|---|---|---|
| 432 | CONDITION | ACTION |
| 436 | DAYTIME | RATING=1 |
| 437 | NIGHT | RATING=0.5 |
| 438 | WEEKEND | RATING=0.8 |

| 440 | THRESHOLD RULES | |
|---|---|---|
| 442 | CONDITION | ACTION |
| 446 | 100% THRESHOLD | ACTION=TERMINATE |
| 447 | 90% THRESHOLD | ACTION=DOWNGRADE |
| 448 | 50% THRESHOLD | ACTION=NOTIFY |
| 449 | 0% THRESHOLD | ACTION=NOTIFY |

FIG. 4

| METERING POLICY | | |
|---|---|---|
| 510 | ATTRIBUTES | |
| 511 | NAME | OVERAGE 50 |
| 512 | POLICY TYPE | CONTROLLED OVERAGE |
| 513 | PRIORITY | 20 |
| 514 | QUOTA TYPE | MONETARY |
| 515 | QUOTA | 50 |
| 516 | RECURRENCE | MONTHLY |

| 520 | APPLICABILITY RULES | |
|---|---|---|
| 522 | CONDITION | ACTION (524) |
| 526 | CONSUMED POLICY? | ACTION=OVERAGE 50 |

| 530 | RATING RULES | |
|---|---|---|
| 532 | CONDITION | ACTION (534) |
| 536 | PRIMARY ML QUOTA TYPE=DATA | RATING=.5/MB |
| 537 | PRIMARY ML QUOTA TYPE=CURRENCY | RATING=2 |
| 538 | PRIMARY ML QUOTA TYPE=TIME | RATING=.1/SECOND |

| 540 | THRESHOLD RULES | |
|---|---|---|
| 542 | CONDITION | ACTION (544) |
| 546 | 100% THRESHOLD | NOTIFY & TERMINATE |
| 547 | 90% THRESHOLD | NOTIFY |
| 548 | 50% THRESHOLD | NOTIFY |
| 549 | 0% THRESHOLD AND NOTIFY ON | NOTIFY |

HIERARCHICAL METERING POLICY ATTRIBUTES

TECHNICAL FIELD

Various exemplary embodiments disclosed herein relate generally to communications networks, in particular to policy and charging in communications networks.

BACKGROUND

Communications networks provide network services to numerous subscribers. The number of subscribers accessing a network may easily reach into the millions. A network service provider must manage the network to meet service agreements with each subscriber, maintain security, manage network resources, and correctly charge each subscriber. As the number of subscribers grows, there is demand for network management solutions that efficiently manage network services while allowing flexibility among different subscribers and different contexts.

In view of the foregoing, it would be desirable to provide a network policy node and method for efficiently managing a subscriber network. In particular, it would be desirable to provide a node that manages the network by flexibly monitoring subscriber usage.

SUMMARY

In light of the present need for a network policy node and method for efficiently managing a subscriber network, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy and charging rules node (PCRN) for managing usage of a subscriber. The method may include: defining a primary metering policy having a first applicability condition and a first quota; defining a secondary metering policy having a plurality of attributes including a second applicability condition and at least one inherited attribute that references an attribute of the primary metering policy; determining that the second metering policy is applicable when the first applicability condition and the second applicability condition are true; selecting the secondary metering policy as an active metering policy; and managing subscriber usage according to the attributes of the secondary metering policy.

In various alternative embodiments, the step of managing subscriber usage includes: measuring subscriber usage according to a rating factor of the secondary metering policy; and charging the measured subscriber usage to both the primary metering policy and the secondary metering policy. The method may also include defining a plurality of primary metering policies having an applicability condition and a quota; determining a set of applicable primary metering policies; and defining a quota of the secondary metering policy to be the sum of the quotas of the set of applicable primary metering policies.

In various alternative embodiments, the secondary metering policy may include at least one threshold rule including a threshold action and a threshold condition defined as a percentage of the quota of the secondary metering policy, and the method may also include: evaluating the threshold condition by comparing an accumulated usage charged to the secondary metering policy with the threshold condition; and executing the threshold action if the accumulated usage exceeds the threshold condition. The step of charging the measured subscriber usage to both the primary metering policy and the secondary metering policy may include: selecting one primary metering policy of the set of applicable primary metering policies; adding the measured subscriber usage to a counter for the selected primary metering policy; and determining the accumulated usage of the secondary metering policy to be the sum of the counters for each metering policy in the set of applicable metering policies.

In various alternative embodiments, the method may also include determining a second set of applicable primary metering policies; and redefining the quota of the secondary metering policy to be the sum of the quotas of the set of applicable primary metering policies.

In various alternative embodiments, the step of managing subscriber usage includes: selecting the primary metering policy as a basis for the secondary metering policy; measuring subscriber usage according to the selected primary metering policy; and charging the measured usage to the secondary metering policy. The secondary metering policy may include a pre-defined static quota and at least one threshold rule including a threshold action and a threshold condition defined as a percentage of the quota of the secondary metering policy, and the method may also include: evaluating the threshold condition by comparing an accumulated usage charged to the secondary metering policy with the threshold condition; and executing the threshold action if the accumulated usage exceeds the threshold condition.

In various alternative embodiments, the secondary metering policy includes a plurality of rating rules including a rating condition and a rating factor, wherein each rating rule is based on a primary metering policy. The method may also include: determining a set of applicable consumed primary metering policies; selecting one of the applicable consumed primary metering policies as a basis for the secondary metering policy; selecting the rating rule based on the selected primary metering policy; measuring usage according to the rating factor of the selected rating rule; and charging the usage to the secondary metering policy. Furthermore, each applicable consumed metering policy may include an indication of whether overage is allowed, and the step of selecting one of the applicable consumed metering policies may include selecting a primary metering policy that allows overage.

Various exemplary embodiments relate to a tangible and non-transitory machine-readable storage medium encoded with instructions thereon for execution by a network element of a telecommunication network. The instructions may configure the operation of the network element to perform the above described method.

BRIEF DESCRIPTION OF THE DRAWINGS

In order to better understand various exemplary embodiments, reference is made to the accompanying drawings, wherein.

DETAILED DESCRIPTION

Recent trends in subscriber network usage patterns require advanced policy management. In general, subscribers and providers desire network management that allows dynamic policies that change to match rapidly changing contexts. Subscribers may use multiple devices to access a service provider's network and may not want to maintain a separate account for each device. Multiple technologies converge in modern user devices allowing network access through different paths from the same device, which may require separate policies for monitoring and controlling usage. Users and subscribers may want service plans that allow users to access the network with any device via any path and accurately reflect the cost of such usage on the network. As network services become more complicated, subscribers often experience "bill shock" when they receive a bill for more than expected.

A metering policy provides a useful mechanism for both monitoring subscriber usage and managing the subscriber's connection. A network operator may create a variety of metering policies that are applicable to various use scenarios. Metering policies may correspond to the various subscriber plans and options offered by the service provider, and include a quota of network usage associated with the plan or option. As a subscriber uses the network, changing devices or connection paths along the way, a policy and charging rules node (PCRN) may select the most appropriate metering policy and charge the usage accordingly. If a subscriber exhausts the quota associated with the active metering policy, the subscriber may be switched to an alternative metering policy for continued access to the network. Metering policies may additionally reduce "bill shock" by using thresholds to notify the subscriber or alter the session as usage accumulates.

In particular, additional flexibility may be obtained by using hierarchical metering policies that inherit attributes of other metering policies. For example, a virtual metering policy may be used to aggregate multiple metering policies together and provide accurate information related to the subscriber's total available usage for a current session. As another example, a controlled overage metering policy may be used to measure different types of usage and charge all overage usage to a single quota.

Referring now to the drawings, in which like numerals refer to like components or steps, there are disclosed broad aspects of various exemplary embodiments.

Figure 1:
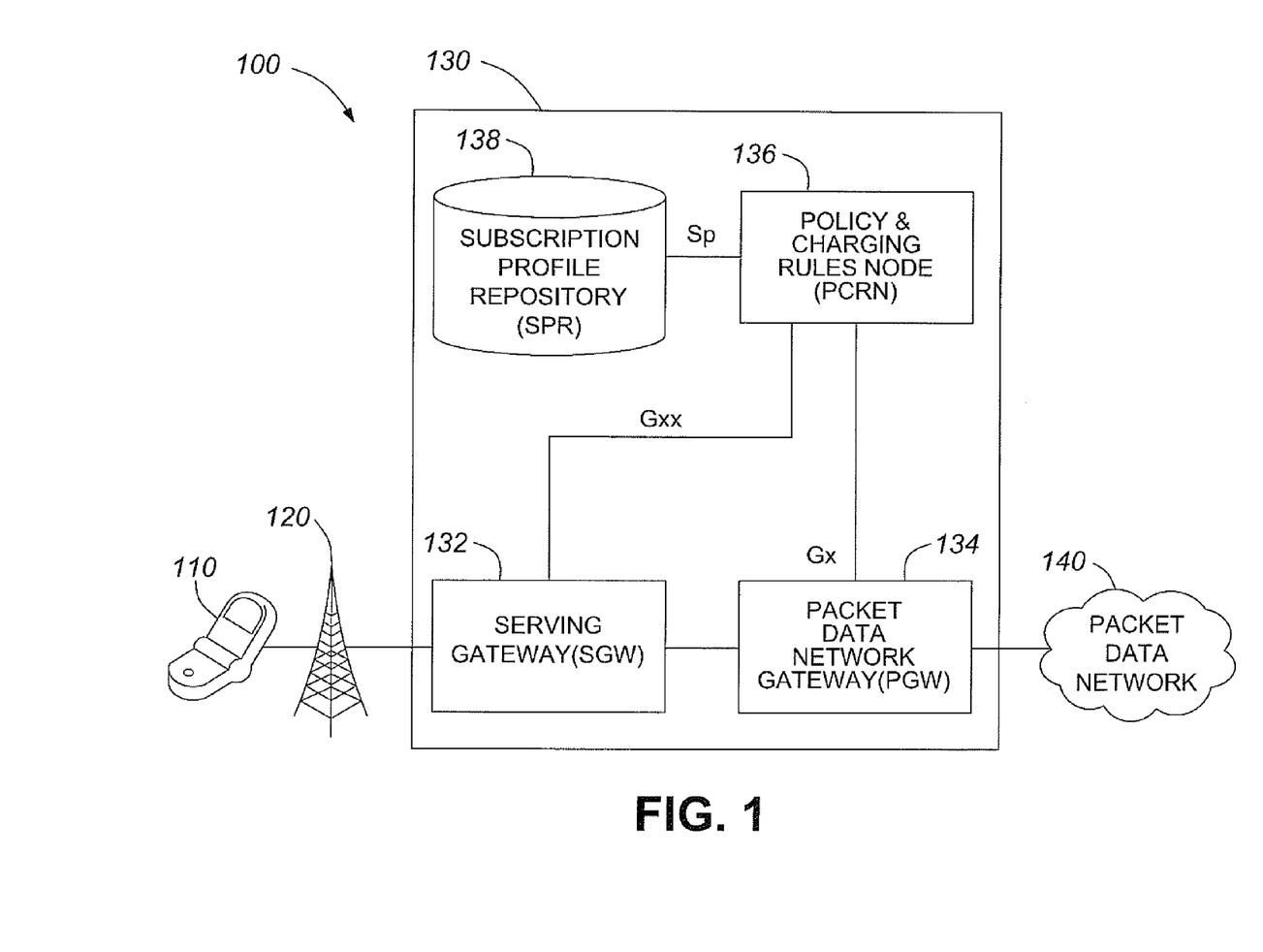
FIG. 1 illustrates an exemplary subscriber network for providing various data services.

FIG. 1 illustrates an exemplary subscriber network 100 for providing various data services. Exemplary subscriber network 100 may be a communications network, such as an LTE or 4G mobile communications network, for providing access to various services. The network 100 may include user equipment 110, base station 120, evolved packet core (EPC) 130, and packet data network 140. User equipment 110 may be a device that communicates with packet data network 140 for providing an end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or association of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130 to an end user of network 100. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the proxy mobile IP (PMIP) standard, SGW 132 may include a bearer binding and event reporting function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140 to an end user of network 100. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. For example, PGW 134 may provide subscriber usage information to PCRN 136 according to armed metering rules determined by PCRN 136. PGW 134 may provide usage information of different types such as, for example, uplink volume, downlink volume, total volume, time, credit, or currency. PGW 134 may use a Vendor-Specific attribute value pair (AVP) to provide usage information. It should be noted that while exemplary network 100 corresponds to one particular implementation of long term evolution (LTE), many variations may exist. For example, SGW 132 may not be present, PGW 134 may not be present, and/or the functions of SGW 132 and PGW 134 may be consolidated into a single device or spread across multiple additional devices.

Policy and charging rules node (PCRN) 136 may be a device that monitors subscriber usage and manages subscriber sessions based on subscriber policies and usage information. For example, PCRN 136 may, for each subscriber session, select an applicable metering policy for monitoring the subscriber's network usage. PCRN 136 may communicate with SGW 132 and PGW 134 via a Gxx and a Gx interface, respectively. PCRN 136 may arm SGW 132 and/or PGW 134 with usage reporting rules for desired subscriber usage information according to the selected metering policy. PCRN 136 may receive usage information in the form of a Vendor-Specific AVP. PCRN 136 may generate and/or modify PCC rules to control how SGW 132 and PGW 134 treat subscriber traffic.

In the process of monitoring subscriber usage, PCRN 136 may make use of metering policies, the details of which will be described below with reference to FIGS. 2-8. PCRN 136 may select an appropriate metering policy for each subscriber session according to applicability conditions and priorities of the metering policies. PCRN 136 may change the selected metering policy as the subscriber's connection changes and/or the subscriber consumes the quota of the metering policy. Metering policies may include static attributes, applicability rules, rating rules, and threshold rules. PRCN 136 may use rating rules to determine how the subscriber's use of the network should be measured. Threshold rules may allow PRCN 136 to take various management actions as the subscriber consumes the quota of a metering policy.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as, for example, subscriber category, subscriber policies or plans, account balances, bandwidth limits, charging parameters, and subscriber priority. SPR 138 may also maintain a record of current subscriber usage according to one or more counters for each metering policy such as, for example, data volume (uplink, downlink, or total), time, or credits.

Packet data network 140 may be a network (e.g., the Internet or another network of communications devices) for providing data communications between user equipment 110 and other devices connected to packet data network 140. Packet data network 140 may further provide, for example, phone and/or Internet service to various user devices in communication with packet data network 140.

Figure 2:
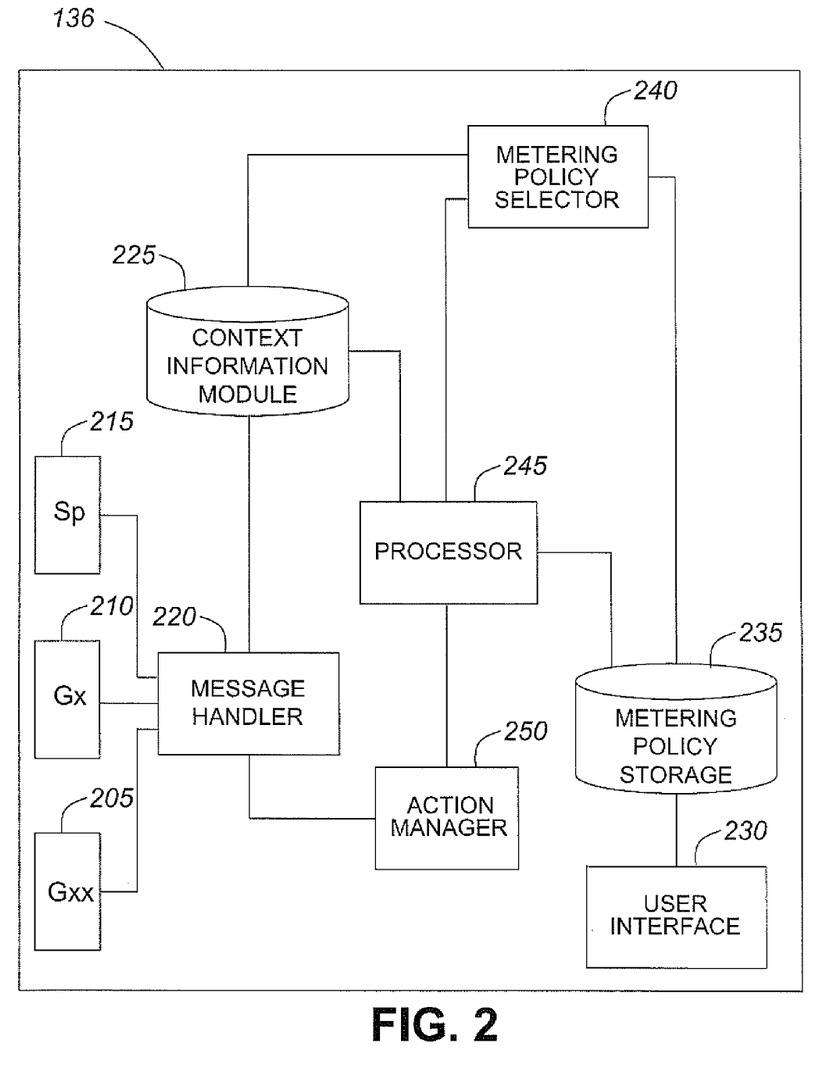
FIG. 2 illustrates an exemplary policy and charging rules node (PCRN) for managing a subscriber network.

FIG. 2 illustrates an exemplary PCRN 136. PCRN 136 may include Gxx interface 205, Gx interface 210, Sp interface 215, message handler 220, context information module 225, user interface 230, metering policy storage 235, metering policy selector 240, processor 245, and action manager 250.

Gxx interface 205 may be an interface comprising hardware and/or executable instructions encoded on a machine-readable storage medium configured to communicate with a SGW such as SGW 132. Such communication may be implemented according to the 3GPP TS 29.212. Thus, Gxx interface 205 may receive requests for QoS rules and transmit QoS rules for installation. Gxx interface 205 may further receive UE-originated application requests, session requests, and event notifications in the form of a CCR.

Gx interface 210 may be an interface comprising hardware and/or executable instructions encoded on a machine-readable storage medium configured to communicate with a PGW such as PGW 134. Such communication may be implemented according to the 3GPP TS 29.212. Thus, Gx interface 210 may receive requests for PCC rules and transmit PCC rules for installation. Gx interface 210 may further receive UE-originated application requests, session requests, and event notifications in the form of a CCR. Gx interface 210 may also receive usage information. Gx interface 210 may determine the type of usage and extract usage amounts from AVPs such as a Usage-Monitoring-Information AVP or Vendor-Specific AVP.

Sp interface 215 may be an interface comprising hardware and/or executable instructions encoded on a machine-readable storage medium configured to communicate with SPR 138. For example, Sp interface 215 may receive subscriber information in the form of a subscriber profile. Sp interface 215 may also send subscriber information or updated subscriber profiles to SPR 138. Such information may include a record of the subscriber's usage associated with a metering policy.

Message handler 220 may include hardware and/or executable instructions on a machine-readable storage medium configured to process usage monitoring messages sent and/or received via Gxx interface 205, Gx interface 210, and/or Sp interface 215. For example, message handler 220 may receive usage accounting messages and other messages from PGW 134. Message handler 220 may provide context information from the messages to rules engine 250, either directly or via context information module 225. Messages received by message handler 220 may trigger selection of a new metering policy or actions according to the active metering policy. As another example, when PCRN 136 executes a threshold action, message handler 220 may construct and transmit a message over Gxx interface 205 and/or Gx interface 210 to instruct other nodes to implement the threshold action. For example, if PCRN 136 creates a new PCC rule according to an applicable metering policy, it may construct a reauthorization request (RAR) message to push the new PCC rule to an appropriate PGW.

Context information module 225 may include hardware and/or executable instructions on a machine-readable storage medium configured to provide various context information to metering policy selector 240 and/or processor 245. For example, context information module 225 may store information carried by a received message. Context information module 225 may further store previously received and/or transmitted messages associated with a subscriber, session, and/or service data flow. Context information module 225 may further access information stored elsewhere such as, for example, subscriber information stored in an SPR such as SPR 138.

User interface 230 may include hardware and/or executable instructions on a machine-readable storage medium configured to provide a network operator with access to PCRN 136. User interface 230 may receive input from a network operator and may include hardware such as, for example, a keyboard and/or mouse. User interface 230 may also display information as output to the network operator and may include, for example, a monitor. A network operator may access metering policy storage 235 via user interface 230. User interface 230 may provide a network operator with various options for creating metering policies and assigning metering policies to subscribers.

Metering policy storage 235 may include operator created metering policies. Metering policies may include static attributes, applicability conditions, rating rules, and threshold rules. Exemplary metering policies will be described in greater detail below with respect to FIGS. 3-5.

Metering policy selector 240 may include hardware and/or executable instructions on a machine-readable storage medium configured to select an appropriate metering policy for a subscriber session. Metering policy selector 240 may first determine which metering policies are applicable to the subscriber and then choose from among the applicable metering policies based on priority. A metering policy may be applicable to a subscriber only if the metering policy has been assigned to the subscriber. Metering policies may be assigned to the subscriber by a network operator or a subscriber may automatically be assigned metering policies when signing up for a service plan, selecting an optional feature, or purchasing network access. Metering policy selector 240 may also evaluate context information to determine whether a metering policy is applicable. Context information relevant to selecting a metering policy may include information about the user equipment 110, the network connection path, or subscriber information. For example, a metering policy may be applicable for one user equipment device of a subscriber, but not for another user equipment device of the same subscriber.

Metering policy selector 240 may choose a single metering policy when multiple metering policies are applicable to a subscriber session. For example, a subscriber may have a first metering policy that is applicable to use with the subscriber's iPhone and a second metering policy that is applicable when connected to a 4G network. If such a subscriber connected to a 4G network using the iPhone, metering policy selector 240 may choose one metering policy based on priority or consumption. Each metering policy may include a unique priority such that metering policy selector 240 will always be able to select a metering policy. Lower cost or pre-paid metering policies may have a higher priority than more expensive, or pay-as-you-go metering policies. Metering policy selector 240 may also access context information module 225 to determine whether an applicable metering policy has already been consumed, in which case, another metering policy may be selected.

Processor 245 may include hardware and/or executable instructions on a machine-readable storage medium configured to monitor subscriber usage according to an active metering policy. Processor 245 may first determine how a subscriber's usage should be measured. Processor 245 may extract a quota type from the metering policy to determine the type of usage to meter. Processor 245 may evaluate rating rules within a metering policy to determine a rating factor for weighting subscriber usage. The rating factor for subscriber usage may depend on factors such as, for example, time of day, network location, required bandwidth, or other characteristics of the service. Once a rating factor has been determined, processor 245 may use message handler 220 to generate a usage monitoring request to arm another network node, such as a PGW, to report applicable usage. If the usage monitoring request includes a rating factor, the other network node may multiply actual usage by the rating factor before reporting the usage to PCRN 136. Alternatively, processor 245 may multiply reported usage by the rating factor when a usage report is received at the PCRN 136.

Processor 245 may collect usage information for a subscriber and compare it with a metering policy quota. Processor 245 may use a counter that stores the accumulated usage of the subscriber from multiple usage reporting messages. Processor 245 may compare the accumulated subscriber usage stored in the counter with the quota of the active metering policy to determine whether the subscriber has consumed the metering policy. Processor 245 may also compare the accumulated subscriber usage with various threshold rules defined in the metering policy to determine whether to perform threshold actions. If processor 245 determines that a threshold action should be performed, processor 245 may trigger action manager 250 to perform the action.

Action manager 250 may perform policy node actions selected by processor 245. Policy node actions for a metering policy may include session actions and/or flow actions. Session actions may include: setting an access point name (APN) bitrate, setting primary bearer properties, creating or modifying charging and/or QoS rules, sending a notification via email, SMS, or other systems, sending session commands, setting a QoS class, and changing an Allocation Retention Priority (ARP), and other actions for session level management. Flow actions may include: sending a notification via email, SMS, or other systems, setting a rating factor for a bearer, setting a metering method, overriding a PCC rule bandwidth, setting an ARP, setting a service identifier, or any other action for flow level management. Action manager 250 may generate or update QoS and/or PCC rules to provide the subscriber with correct service according to the metering policy. Action manager 250 may also update context information storage 225, SPR 138, or other stored data. Action manager 250 may use message handler 220 to forward updated rules to network components such as SGW 132 and PGW 134.

Figure 3:
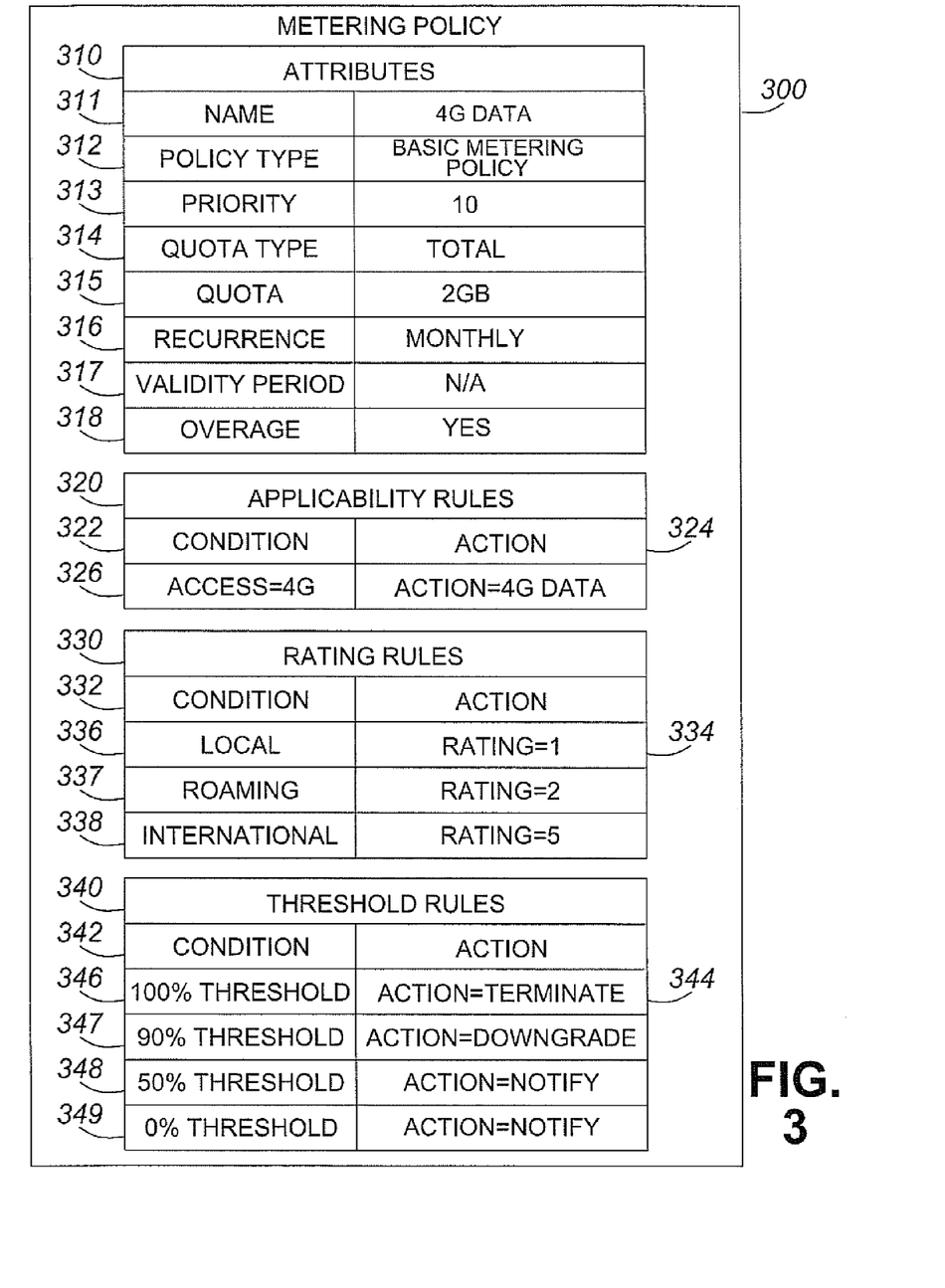
FIG. 3 illustrates an exemplary primary metering policy.

FIG. 3 illustrates an exemplary primary metering policy 300. Metering policy 300 may include attributes 310, applicability rules 320, rating rules 330, and threshold rules 340. Metering policy 300 may be created or modified by a network operator using user interface 230.

Attributes 310 may include static properties of the metering policy set when the metering policy is created. As an example, attributes 310 may include: name 311, metering policy type 312, priority 313, quota type 314, quota 315, recurrence 316, validity period 317, and overage 318. Name 311 may be a unique name used to refer to a metering policy. A metering policy name may correspond to a plan name or service option. Metering policy type 312 may indicate the type of metering policy. Metering policy types may include, for example, managed metering policies, virtual metering policies, unlimited metering policies, and controlled overage metering policies. Priority 313 may be a rating of the priority of the metering policy as compared to other metering policies. Priority 313 may be used by metering policy selector 240 to select a metering policy when there are multiple applicable metering policies. Each metering policy may be assigned a unique priority 313 to prevent conflicts. Quota type 314 may indicate a counter that is measured for a metering policy. Quota types may include uplink volume, downlink volume, total volume, monetary value, time, or other measurements of network usage. Quota 315 may indicate a value of usage for a subscriber counter corresponding to quota type 314 that is allocated for a subscriber. If the subscriber's usage counter value exceeds quota 315, metering policy 300 may be consumed and PCRN 136 may change metering policies or take other network management actions. Recurrence 316 may indicate how often a metering policy resets. Exemplary periods for recurrence 316 include daily, weekly, monthly, etc. Recurrence 316 may also indicate no recurrence, in which case validity period 317 may be included to indicate when the metering policy expires. Overage 318 may indicate whether the metering policy may be used as a basis for overage usage if the metering policy has been consumed.

Applicability rules 320 may include one or more rules for determining whether the metering policy 300 applies in a context. An applicability rule may include an applicability condition 322 and an applicability action 324. An applicability condition may include any condition based on context information that can be logically evaluated to determine whether the metering policy is applicable. As an example, the applicability condition of rule 326 may indicate that the rule is applicable when the access type is 4G. Other subscriber and user equipment characteristics may be useful for creating applicability conditions for metering policies. Applicability action 324 may include designating the metering policy as an applicable metering policy, for example, by adding the metering policy name 311 to a result list of applicable metering policies or setting the active metering policy to the metering policy name 311.

Rating rules 330 may be dynamic attributes for determining a rating factor used to measure usage for metering policy 300. Rating rules 330 may include one or more rating rules, each rule including conditions 332 and actions 334. As an example, a rating factor may be based on the network location of a user device. Exemplary rating rules 336, 337, and 338 may illustrate such a rating policy. Rating rule 336 may indicate that when user device 110 is connected to a local network, data traffic has a rating of 1. Rating rule 337 may indicate that when user device 110 is roaming, data traffic has a rating of 2. Rating rule 338 may indicate that when user device 110 is roaming internationally, data traffic has a rating of 5. PCRN 136 or PGW 134 may multiply raw usage amounts by the rating factor before adding the usage to a counter for comparison with quota 315. While the exemplary rules have been simplified, it should be understood that a metering policy 300 may include multiple rating rules with additional conditions based on other factors such as, for example, time of day, destination location, guaranteed bandwidth, subscriber properties or any other factor influencing a network service. Actions 336 may include an action to set the rating factor, but may include additional actions such as, for example, sending a message to the user device indicating the rating factor. If no rating rules 330 are configured for a metering policy, a default rating factor of 1 may be used.

Threshold rules 340 may be dynamic attributes for comparing a counter to a quota 315. Threshold rules 340 may include one or more threshold rules, each rule including conditions 342 and actions 344. Conditions 342 may include implicit conditions based on a percentage of quota usage. Conditions 342 may also include explicit conditions based on, for example, subscriber preferences. Threshold rules 340 may be generated and evaluated in order of the threshold percentage of the implicit conditions. Actions 344 may broadly include session actions and flow actions. Actions 344 may also be broadly classified as notification, modification, or termination. Exemplary threshold rules 346, 347, 348, and 349 may illustrate a possible set of threshold rules. Threshold rule 346 may indicate that PCRN 136 should terminate service when the subscriber's usage has reached 100% of the quota. Threshold rule 347 may indicate that PCRN 136 should downgrade the subscriber's service, for example, by limiting bandwidth, when the subscriber has reached 90% of the quota. Threshold rule 348 may indicate that PCRN 136 should notify the subscriber when the subscriber has reached 50% of the quota. Threshold rule 349 may indicate that PCRN 136 should notify the subscriber when the subscriber is at 0% of the quota, that is, the metering policy is new or has been reset. It should be apparent that threshold rules 340 may be configured with additional or more complicated rules to meet the demands of subscribers and providers.

Figure 4:
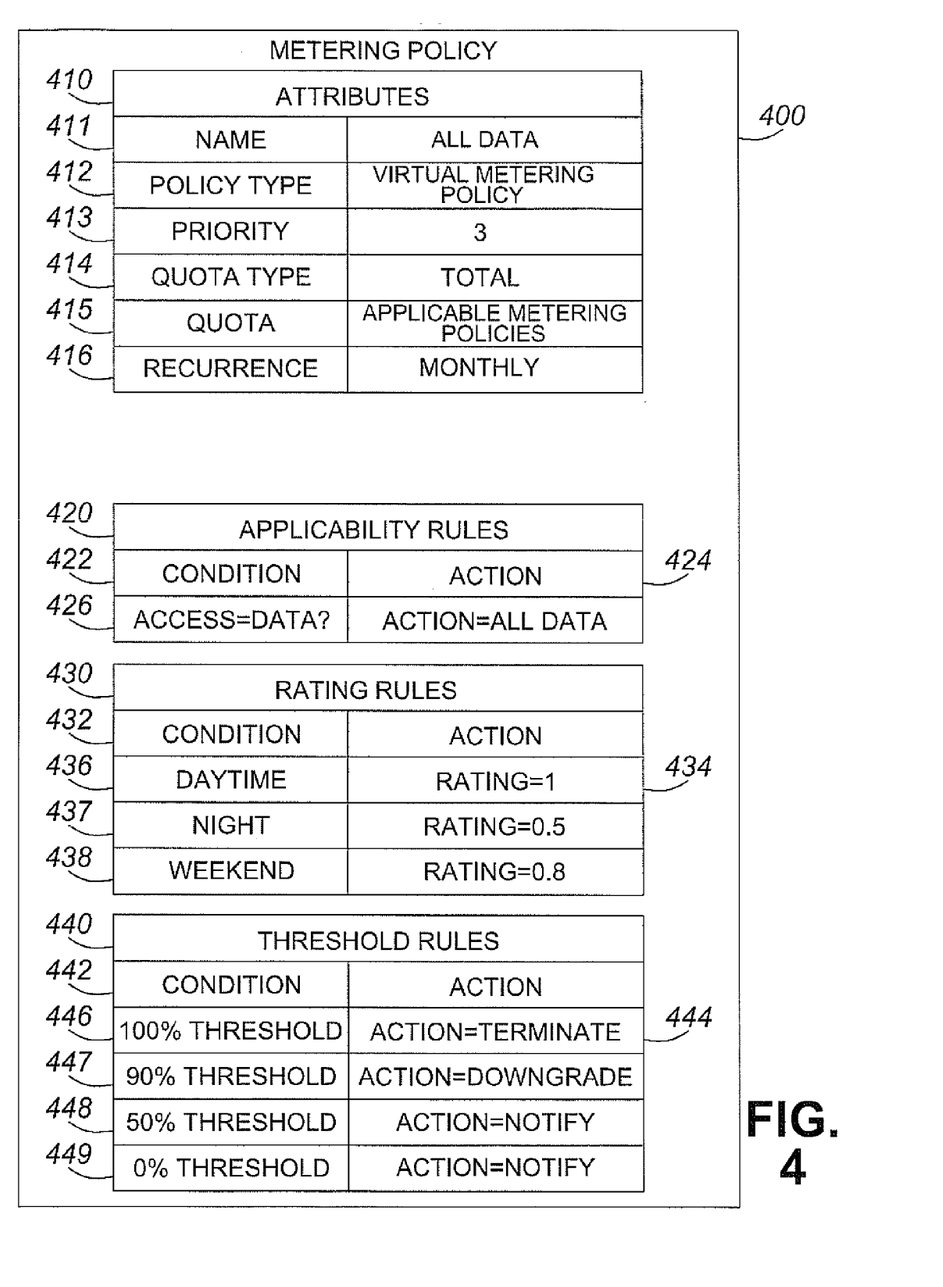
FIG. 4 illustrates an exemplary virtual metering policy.

FIG. 4 illustrates an exemplary virtual metering policy 400. Metering policy 400 may include similar attributes and rules fields to metering policy 300, but measure usage differently. Metering policy 400 may be a virtual metering policy that inherits attributes from one or more primary metering policies such as, for example, metering policy 300. Metering policy 400 may be named "All Data" (411) and be a virtual metering policy (412). Metering policy 400 may have a priority (413) of 3, indicating that it should be chosen before metering policy 300 if both metering policies are applicable. Metering policy 400 may aggregate all other applicable metering policies such as, for example, all metering policies used for data. Metering policy 400 may measure the total volume (414) of data in both uplink and downlink directions. The quota 415 for metering policy 400 may be the sum of all applicable metering policies. The quota for a virtual metering policy may change as different metering policies become applicable. For example, if a subscriber moves within range of an access point (APN) for which he or she has been assigned a separate metering policy, the virtual metering policy quota may increase. Metering policy 400 may reset monthly, or when any applicable metering policy resets.

Applicability rules 420 may indicate that metering policy 400 is applicable whenever data service is available or there is an applicable primary data metering policy.

In various exemplary embodiments, rating rules 430 may be defined for a virtual metering policy. For example, rating rules 430 may provide a variety of rating factors based on time of day. Daytime usage may receive a rating factor of 1, while night and weekend usage may be discounted to rating factors of 0.5 and 0.8 respectively. Therefore, a subscriber may receive more usage if he uses the service at low volume times. In various alternative embodiments, rating rules 430 may be inherited from a primary metering policy. For example, if metering policy is 300 is applicable, metering policy 400 may use rating rules 330. In various alternative embodiments, metering policy 400 may use both a defined set of rating rules 430 and rating rules inherited from a primary metering policy.

Threshold rules 440 may provide for various actions as the subscriber uses the service. Threshold rules 440 may be based on the quota 415, which as described above, may be a sum of one or more applicable primary metering policies. Therefore, threshold rules 440 may reflect total available quota rather than the quota of a single metering policy. For example, the subscriber may receive notifications when metering policy 400 is first used and when the subscriber reaches 50% of the quota 415 if the subscriber has requested such notifications. One or more applicable primary metering policies may have been used, but the subscriber may only be notified about his or her total quota. Threshold rule 447 may indicate that the service may be downgraded, for example, by stopping high bandwidth data flows as the subscriber's usage approaches the quota 415. Threshold rule 446 may indicate that the subscriber will be notified when the quota is reached and the service will be terminated. The notification may include instructions for acquiring a new metering policy.

Figure 5:
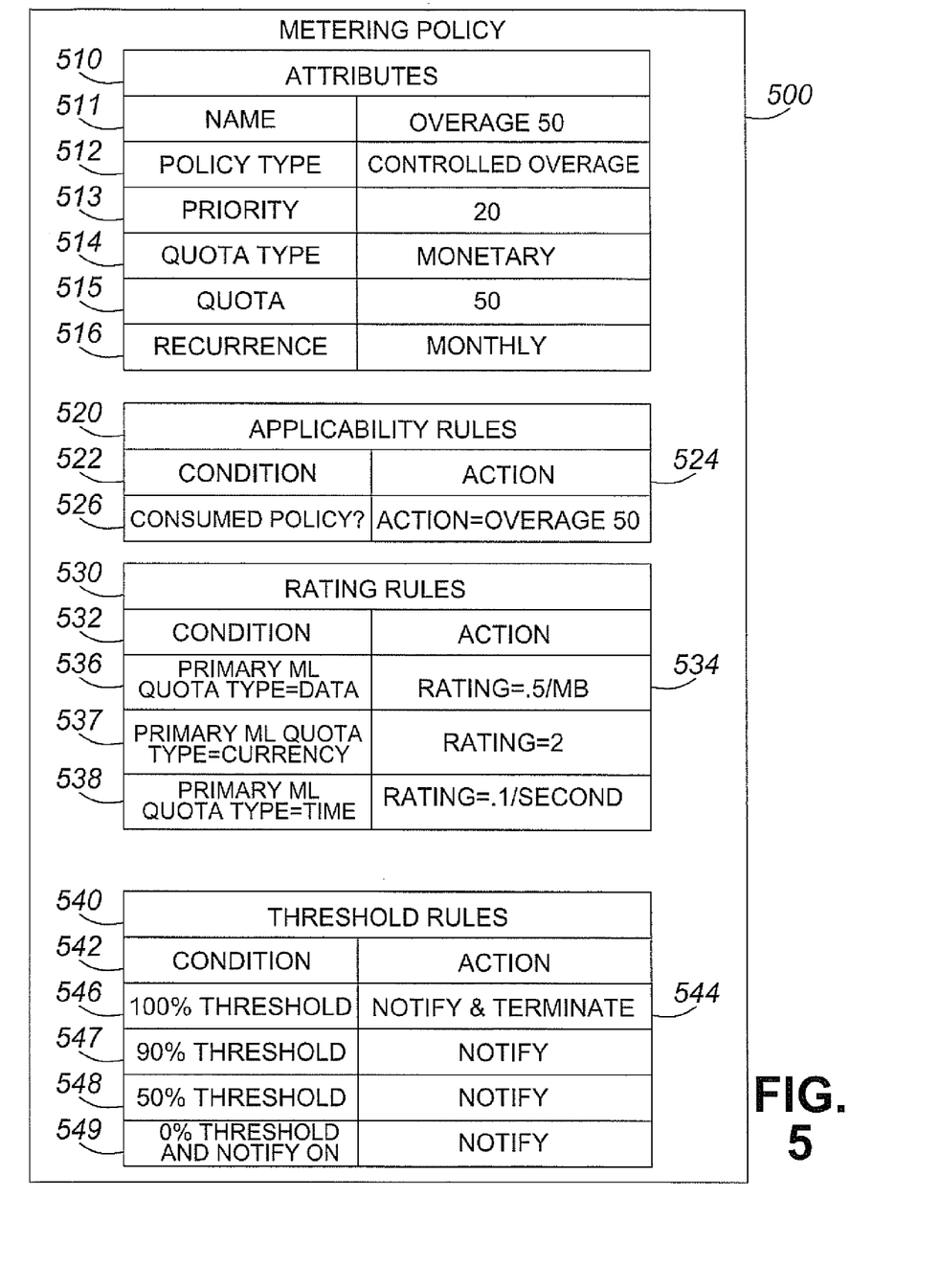
FIG. 5 illustrates an exemplary controlled overage metering policy.

FIG. 5 illustrates an exemplary controlled overage metering policy 500. Metering policy 500 may include similar attributes and rules fields to metering policy 300, but measure usage differently. Metering policy 500 may be a controlled overage metering policy that inherits attributes from one or more primary metering policies such as, for example, metering policy 300. Metering policy 500 may be named "Overage 50" (511) and be a controlled overage metering policy (512). Metering policy 500 may have a priority (513) of 20, indicating that it should be selected after metering policy 300 and metering policy 400 if all three metering policies are applicable. A controlled overage metering policy may have a lower priority than primary metering policies so that the primary metering policies are used first. Metering policy 500 may be used to measure different types of usage against a single quota. For example, metering policy 500 may measure usage in monetary value (514) and have a quota 515 of $50. Such a quota may reflect an acceptable amount that a subscriber is willing to pay for usage beyond a pre-paid plan. Metering policy 500 may reset monthly (516).

Applicability rules 520 may indicate that metering policy 500 is applicable whenever an applicable metering policy has been consumed. Metering policy 500 may select an applicable but consumed metering policy as the basis for rating rules 530. Rating rules 530 may indicate a conversion rate between a primary metering policy and metering policy 500. Rules 536-538 are provided as examples of such a rating policy. Rule 536 may indicate that usage according to a primary metering policy that measures according to total volume should be rated at $0.50 per Mb. Rule 537 may indicate that usage according to a metering policy that measures usage according to currency should be rated at twice the rate for overage usage. Rule 538 may indicate that usage according to a metering policy that measures usage according to time should be rated at $0.50 per minute. Rating rules 530 may be used along with rating rules inherited from a primary metering policy. For example rule 536 and rule 337 may be combined such that roaming data usage is actually rated at $1.00 per Mb.

Threshold rules 540 may provide for various actions as the subscriber uses the service. Threshold rules 540 may be based on the quota 515. For example, the subscriber may receive notifications when metering policy 500 is first used and when the subscriber reaches 50% of the quota 515 if the subscriber has requested such notifications. In such a manner, the subscriber may be informed that he or she is now incurring overage charges. Threshold rule 547 may indicate that the service may be downgraded, for example, by stopping high bandwidth data flows as the subscriber's usage approaches the quota 515. Threshold rule 546 may indicate that the subscriber will be notified when the quota is reached and the service will be terminated. The notification may include instructions for acquiring a new metering policy or accepting additional overage charges.

Although two examples of hierarchical metering policies have been provided, it should be apparent that hierarchical metering policies allow for usage metering and management of a wide variety of communication services. Appropriate metering policies may be created by network operators to meet the complex needs of their subscribers.

Figure 6:
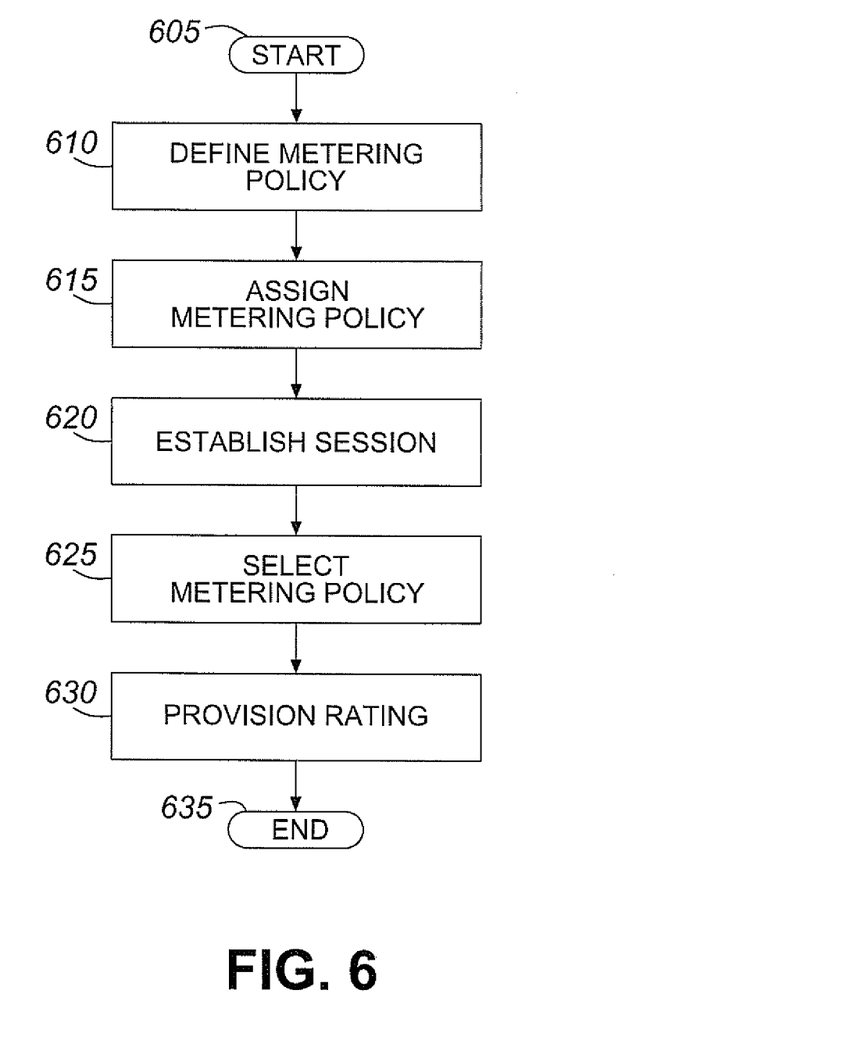
FIG. 6 illustrates a flowchart showing an exemplary method for managing usage of a service.

FIG. 6 illustrates a flowchart showing an exemplary method 600 for managing usage of a service. Method 600 may be performed by the various components of PCRN 136. Method 600 may begin at step 605 and proceed to step 610.

In step 610, a network operator may use user interface 230 of PCRN 136 to define one or more metering policies. The network operator may be presented with a graphical user interface for selecting the attributes of the metering policy and creating applicability rules, rating rules, and threshold rules. Once a metering policy has been created, it may be stored in metering policy storage 235. The network operator may also modify metering policies. The method may then proceed to step 615.

In step 615, PCRN 136 may assign metering policies to individual subscribers. In various exemplary embodiments, PCRN 136 may receive subscriber information from SPR 138 via Sp interface 215 indicating what plans, options and purchases subscribers have chosen and automatically assign metering policies to subscribers based on such subscriber information. Alternatively, assignment of metering policies may be accomplished by a network operator using user interface 230.

In step 620, a subscriber using user equipment 110 may establish a session with network 140 via EPC 130. PCRN 136 may make policy decisions to provision SGW 132 and/or PGW 134 with appropriate rules to provide the session. It should be apparent that multiple subscribers may simultaneously establish sessions and PCRN 136 may repeatedly perform the steps of method 600 as subscribers connect and disconnect from the subscriber network 100. For simplicity, the method 600 as applied to a single subscriber will be described. After the session is established, the method 600 may proceed to step 625.

In step 625, PCRN 136 may select a metering policy for the session. PCRN 136 may select a metering policy based on assignment to the subscriber, applicability rules, priority and consumption. Once a single metering policy has been selected, the metering policy may be considered the active metering policy for the session and the method may proceed to step 630.

In step 630, PCRN 136 may determine a rating factor and provision another node such as PGW 134 with metering information. PCRN 136 may select the rating factor according to the rating rules of the active metering policy. PCRN 136 may arm PGW 134 by requesting usage reports at certain levels of usage and/or at session events such as change of connection path or termination. The method 600 may then proceed to step 635, where the method ends.

Figure 7:
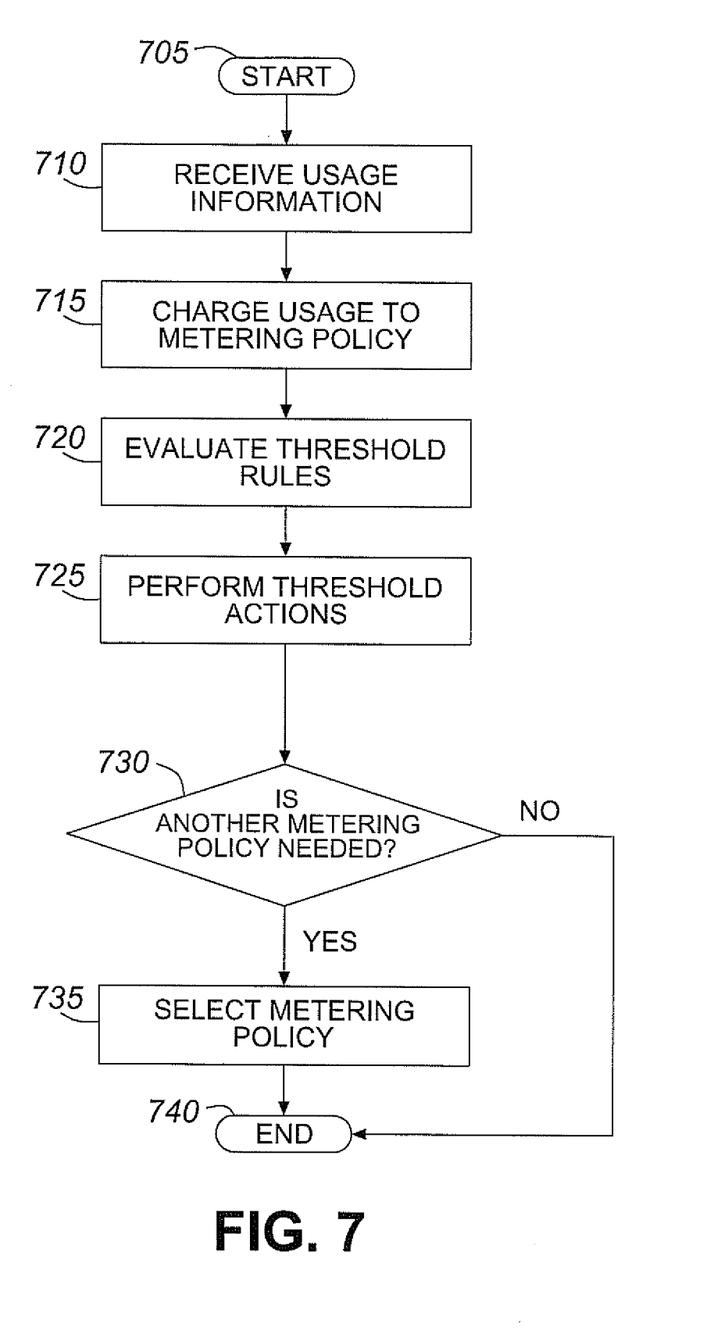
FIG. 7 illustrates a flowchart showing an exemplary method of managing a network based on subscriber usage.

FIG. 7 illustrates a flowchart showing an exemplary method 700 of managing a network based on subscriber usage. Method 700 may be performed by the various components of PCRN 136. Method 700 may begin at step 705 and proceed to step 710.

In step 710, PCRN 136 may receive usage information for a subscriber. For example, PCRN 136 may receive a usage report from PGW 134 via Gx interface 210 indicating an amount of usage. PGW 134 may have already applied a rating factor to the amount of usage included in the usage report. Alternatively, PCRN 136 may apply a rating factor by multiplying the amount of usage in the usage report by the rating factor. The method may then proceed to step 715.

In step 715, PCRN 136 may add the amount of usage from the usage report to a counter including accumulated usage for the metering policy. PCRN 136 may store the counter locally, or the counter may be stored in SPR 138. The counter may store accumulated usage according to quota type 315. The counter may accumulate usage for multiple sessions for the subscriber. Multiple sessions may occur, for example, when a subscriber concurrently accesses the network with two devices for which the metering policy is applicable. Multiple sessions may also include separate sessions for the same device. The counter for each metering policy may continue to accumulate usage until it is reset according to the recurrence 316. Once the amount of usage from the usage report has been added to the counter, the method may proceed to step 720.

In step 720, PCRN 136 may evaluate threshold rules included in the active metering policy for the subscriber. The threshold rules may be evaluated separately, or they may be evaluated along with normal rules for handling session events such as, for example, reported usage or session termination. Threshold rules may take precedence over normal event processing rules. PCRN 136 may select multiple threshold actions by evaluating threshold rules. The method may then proceed to step 725.

In step 725, PCRN 136 may perform threshold actions selected by evaluating the threshold rules. For each threshold action, action manager 250 may perform local actions and/or use message handler 220 to update other nodes such as SGW 132 and/or PGW 134. For example, if the threshold action indicates a change in subscriber QoS, PCRN 136 may generate new PCC/QoS rules and send the new rules to SGW 132 and/or PGW 134. PCRN 136 may also send notifications to the subscriber by email, SMS or other messaging systems if required by the threshold rules. The method may then proceed to step 730.

In step 730, PCRN 136 may determine whether a new metering policy is needed because the active metering policy has been consumed or is no longer applicable. The metering policy may have been consumed, meaning the usage exceeds the quota, because the amount of usage may have increased the counter beyond the subscriber's quota for the active metering policy. The metering policy may also no longer be applicable because of the changes reported with the usage information or because of the threshold actions performed. If the active metering policy has been consumed or is no longer applicable, the method may proceed to step 735. Otherwise, the method may proceed to step 740, where the method ends.

In step 735, the process of selecting a new metering policy may be similar to the process described above with respect to step 625. The selection of the new metering policy may be based on assignment to the subscriber, applicability rules, priority, and consumption. PCRN 136 may also provision a new rating factor as described above with respect to step 630. The method may then proceed to step 740, where the method ends.

Figure 8:
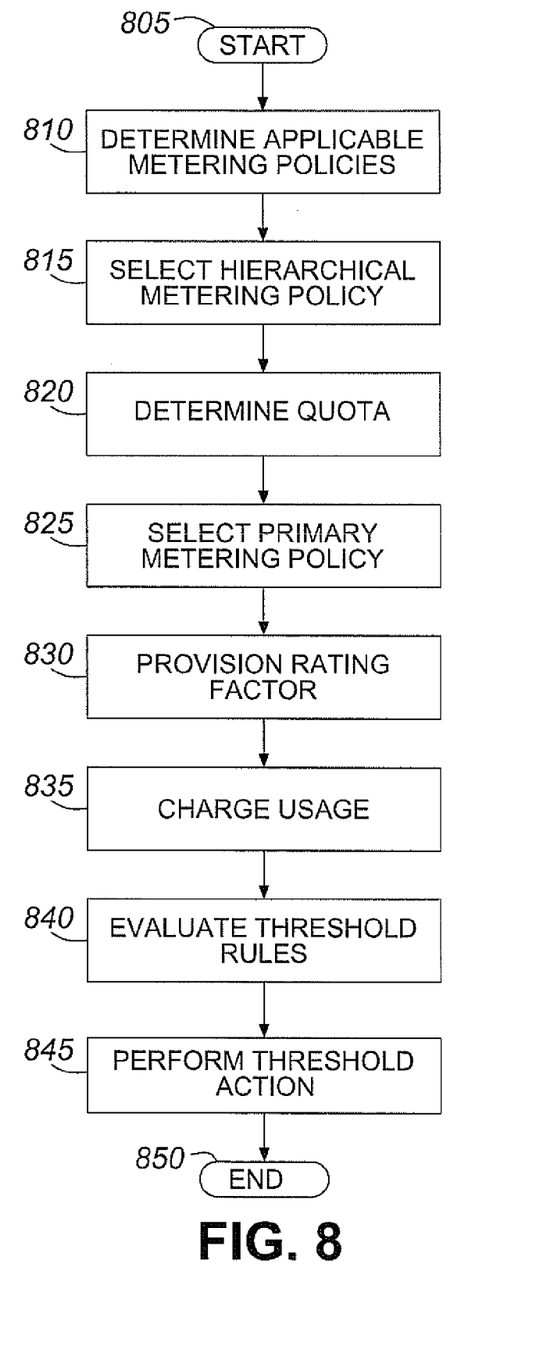
FIG. 8 illustrates a flow chart showing an exemplary method for managing subscriber usage using a hierarchical metering policy.

FIG. 8 illustrates a flow chart showing an exemplary method 800 for managing subscriber usage using a hierarchical metering policy. Method 800 may be performed by the various components of PCRN 136. Method 800 may be used with a virtual metering policy such as metering policy 400, a controlled overage metering policy such as metering policy 500, or other hierarchical metering policies. Method 800 may begin at step 805 and proceed to step 810.

In step 810, PCRN 136 may determine a set of applicable metering policies. Step 810 may be similar to step 625 described above with regard to FIG. 6. PCRN 136 may evaluate the applicability condition of each metering policy assigned to a subscriber. The set of applicable metering policies may include one or more hierarchical metering policies such as, for example, virtual metering policy 400 and controlled overage metering policy 500. The set of applicable metering policies may also include one or more primary metering policies such as, for example, metering policy 300. One or more of the applicable metering policies may have been consumed, meaning the usage of the metering policy meets or exceeds the quota.

In step 815, PCRN 136 may select a hierarchical metering policy as the active metering policy for a subscriber session. PCRN 136 may select the hierarchical metering policy based upon the applicability condition and priority of the metering policy. A virtual metering policy may have a relatively high priority so that it is selected before primary metering policies. A controlled overage metering policy may have a relatively low priority so that it is not selected if there is an applicable and non-consumed metering policy. The method may then proceed to step 820.

In step 820, PCRN 136 may determine the quota for the hierarchical metering policy. In various exemplary embodiments, PCRN 136 may determine the sum of the quotas of all applicable metering policies to determine the quota of a virtual metering policy. In various alternative embodiments, PCRN 136 may adjust the quota of an applicable metering policy using a rating factor. For example, PCRN 136 may reduce a quota of 100 Mb uplink volume to a quota of 50 Mb total volume using a rating factor of 0.5 before adding the quota with other quotas measured in total volume. In various exemplary embodiments, PCRN 136 may determine the quota of a controlled overage metering policy according to a pre-defined value configured in the metering policy definition. In various alternative embodiments, the quota for a controlled overage metering policy may be based on subscriber attributes, such as, for example, a value selected by the subscriber, the subscriber's last statement, and/or an expected base amount of the subscriber. Once a quota for the hierarchical metering policy has been determined, the method may proceed to step 825.

In step 825, PCRN 136 may determine a primary metering policy to use as the basis for the hierarchical metering policy. PCRN 136 may select a primary metering policy from the set of applicable metering policies. For a virtual metering policy, PCRN 136 may select the applicable unconsumed metering policy with the next highest priority. For a controlled overage metering policy, PCRN 136 may select an applicable but consumed metering policy, that is, a metering policy where a counter of subscriber usage meets or exceeds the quota. PCRN 136 may select the highest priority consumed metering policy that allows overage as indicated by, for example, overage field 318. The method may then proceed to step 830.

In step 830, PCRN 136 may provision a rating factor for measured usage. PCRN 136 may determine the rating factor using one or more rating rules included in the hierarchical metering policy and/or rating rules of the selected primary metering policy. PCRN 136 may combine the rating factors from multiple rules by multiplying the rating factors together. As an example, if metering policy 500 is selected as the active metering policy and metering policy 300 is selected as the primary metering policy, the rating factor for international roaming data may be $2.50 per Mb. PCRN 136 may provision other network nodes such as, for example, PGW 134 with the determined rating factor. The method may then proceed to step 835.

In step 835, PCRN 136 may measure the subscriber's usage. For example, PCRN 136 may receive a usage reporting message indicating that the subscriber has used 10 Mb of data. The usage reporting message may indicate that the data is rated as $25. PCRN 136 may charge the amount of usage based on the type of metering policy. For a virtual metering policy, PCRN 136 may add the amount of usage to a counter for both the virtual metering policy and the primary metering policy. Alternatively, PCRN 136 may only add the usage to a counter for the primary metering policy and determine the usage of the virtual metering policy by determining the sum of the counters of the applicable metering policies. For a controlled overage metering policy, PCRN 136 may simply add the reported usage to a counter for the controlled overage metering policy. The method may then proceed to step 840.

In step 840, PCRN 136 may determine whether the amount of usage for the hierarchical metering policy has met any of the threshold conditions of the hierarchical metering policy. PCRN 136 may test both implicit and explicit threshold conditions. If any threshold conditions are applicable, the method may proceed to step 845, where PCRN 136 may perform threshold actions. Otherwise, the method may proceed directly to step 850, where the method ends.

In step 845, PCRN 136 may perform threshold actions selected by evaluating the threshold rules. For each threshold action, action manager 250 may perform local actions and/or use message handler 220 to update other nodes such as SGW 132 and/or PGW 134. For example, if the threshold action indicates a change in subscriber QoS, PCRN 136 may generate new PCC/QoS rules and send the new rules to SGW 132 and/or PGW 134. PCRN 136 may also send notifications to the subscriber by email, SMS or other messaging systems if required by the threshold rules. The method may then proceed to step 850 where the method ends.

According to the foregoing, various exemplary embodiments provide for a network policy node and method of efficiently managing a subscriber network. In particular, by monitoring subscriber usage according to hierarchical metering policies, a policy node may provide flexible network management meeting the needs of subscribers and service providers.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) for managing usage of a subscriber, the method comprising:
defining a primary metering policy having a first applicability condition and a first quota;
defining a secondary metering policy having a plurality of attributes including a second applicability condition and at least one inherited attribute that references an attribute of the primary metering policy;
determining that the second metering policy is applicable when the first applicability condition and the second applicability condition are true;
selecting the secondary metering policy as an active metering policy; and
managing subscriber usage according to the attributes of the secondary metering policy,
wherein the step of managing subscriber usage comprises charging usage to a policy based on an attribute of a different policy,
wherein the step of managing subscriber usage comprises:
measuring subscriber usage according to a rating factor of the secondary metering policy, the second metering policy further comprising a quota; and
charging the measured subscriber usage against the quota of both the primary metering policy and the secondary metering policy.

2. The method of claim 1, further comprising:
defining a plurality of primary metering policies having an applicability condition and a quota;
determining a set of applicable primary metering policies; and
defining a quota of the secondary metering policy to be the sum of the quotas of the set of applicable primary metering policies.

3. The method of claim 2, wherein the secondary metering policy comprises at least one threshold rule including a threshold action and a threshold condition defined as a percentage of the quota of the secondary metering policy, wherein the method further comprises:
evaluating the threshold condition by comparing an accumulated usage charged to the secondary metering policy with the threshold condition; and
executing the threshold action if the accumulated usage exceeds the threshold condition.

4. The method of claim 2, wherein the step of charging the measured subscriber usage to both the primary metering policy and the secondary metering policy comprises:
selecting one primary metering policy of the set of applicable primary metering policies;
adding the measured subscriber usage to a counter for the selected primary metering policy; and
determining the accumulated usage of the secondary metering policy to be the sum of the counters for each metering policy in the set of applicable metering policies.

5. The method of claim 2, further comprising:
determining a second set of applicable primary metering policies; and
redefining the quota of the secondary metering policy to be the sum of the quotas of the set of applicable primary metering policies.

6. A method performed by a policy and charging rules node (PCRN) for managing usage of a subscriber, the method comprising:
defining a primary metering policy having a first applicability condition and a first quota;
defining a secondary metering policy having a plurality of attributes including a second applicability condition and at least one inherited attribute that references an attribute of the primary metering policy;
determining that the second metering policy is applicable when the first applicability condition and the second applicability condition are true;
selecting the secondary metering policy as an active metering policy; and
managing subscriber usage according to the attributes of the secondary metering policy,
wherein the step of managing subscriber usage comprises charging usage to a policy based on an attribute of a different policy,
wherein the step of managing subscriber usage according to the attributes of the secondary metering policy comprises:

selecting the primary metering policy as a basis for the secondary metering policy;
measuring subscriber usage according to the selected primary metering policy; and
charging the measured usage to the secondary metering policy.

7. The method of claim 6, wherein the secondary metering policy includes a pre-defined static quota and at least one threshold rule comprising a threshold action and a threshold condition defined as a percentage of the quota of the secondary metering policy, wherein the method further comprises:
evaluating the threshold condition by comparing an accumulated usage charged to the secondary metering policy with the threshold condition; and
executing the threshold action if the accumulated usage exceeds the threshold condition.

8. The method of claim 6, wherein the secondary metering policy includes a plurality of rating rules including a rating condition and a rating factor, wherein each rating rule is based on a primary metering policy, the method further comprising:
determining a set of applicable consumed primary metering policies;
selecting one of the applicable consumed primary metering policies as a basis for the secondary metering policy;
selecting the rating rule based on the selected primary metering policy;
measuring usage according to the rating factor of the selected rating rule; and
charging the usage to the secondary metering policy.

9. The method of claim 8, wherein each applicable consumed metering policy includes an indication of whether overage is allowed, and the step of selecting one of the applicable consumed metering policies comprises selecting a primary metering policy that allows overage.

10. A non-transitory machine-readable storage medium encoded with instructions thereon for execution by a network element of a telecommunication network, wherein said tangible and non-transitory machine-readable storage medium comprises:
instructions for defining a primary metering policy having a first applicability condition and a first quota;
instructions for defining a secondary metering policy having a plurality of attributes including a second applicability condition and at least one inherited attribute that references an attribute of the primary metering policy;
instructions for determining that the second metering policy is applicable when the first applicability condition and the second applicability condition are true;
instructions for selecting the secondary metering policy as an active metering policy; and
instructions for managing subscriber usage according to the attributes of the secondary metering policy, wherein the instructions for managing subscriber usage comprise charging usage to one of the policies based on an attribute of the other policy,
wherein the instructions for managing subscriber usage comprise:
instructions for measuring subscriber usage according to a rating factor of the secondary metering policy; and
instructions for charging the measured subscriber usage to both the primary metering policy and the secondary metering policy.

11. The non-transitory machine-readable storage medium of claim 10, further comprising:
instructions for defining a plurality of primary metering policies having an applicability condition and a quota;
instructions for determining a set of applicable primary metering policies; and
instructions for defining a quota of the secondary metering policy to be the sum of the quotas of the set of applicable primary metering policies.

12. The non-transitory machine-readable storage medium of claim 11, wherein the secondary metering policy comprises at least one threshold rule including a threshold action and a threshold condition defined as a percentage of the quota of the secondary metering policy, wherein the tangible and non-transitory machine-readable storage medium further comprises:
instructions for evaluating the threshold condition by comparing an accumulated usage charged to the secondary metering policy with the threshold condition; and
instructions for executing the threshold action if the accumulated usage exceeds the threshold condition.

13. The non-transitory machine-readable storage medium of claim 11, wherein the instructions for charging the measured subscriber usage to both the primary metering policy and the secondary metering policy comprise:
instructions for selecting one primary metering policy of the set of applicable primary metering policies;
instructions for adding the measured subscriber usage to a counter for the selected primary metering policy; and
instructions for determining the accumulated usage of the secondary metering policy to be the sum of the counters for each metering policy in the set of applicable metering policies.

14. The non-transitory machine-readable storage medium of claim 11, further comprising:
instructions for determining a second set of applicable primary metering policies; and
instructions for redefining the quota of the secondary metering policy to be the sum of the quotas of the set of applicable primary metering policies.

15. A non-transitory machine-readable storage medium encoded with instructions thereon for execution by a network element of a telecommunication network, wherein said tangible and non-transitory machine-readable storage medium comprises:
instructions for defining a primary metering policy having a first applicability condition and a first quota;
instructions for defining a secondary metering policy having a plurality of attributes including a second applicability condition and at least one inherited attribute that references an attribute of the primary metering policy;
instructions for determining that the second metering policy is applicable when the first applicability condition and the second applicability condition are true;
instructions for selecting the secondary metering policy as an active metering policy; and
instructions for managing subscriber usage according to the attributes of the secondary metering policy, wherein the instructions for managing subscriber usage comprise charging usage to one of the policies based on an attribute of the other policy,
wherein the instructions for managing subscriber usage according to the attributes of the secondary metering policy comprise:
instructions for selecting the primary metering policy as a basis for the secondary metering policy;
instructions for measuring subscriber usage according to the selected primary metering policy; and
instructions for charging the measured usage to the secondary metering policy.

16. The non-transitory machine-readable storage medium of claim 15, wherein the secondary metering policy includes a pre-defined static quota and at least one threshold rule comprising a threshold action and a threshold condition defined as a percentage of the quota of the secondary metering policy, wherein the tangible and non-transitory machine-readable storage medium further comprises:
- instructions for evaluating the threshold condition by comparing an accumulated usage charged to the secondary metering policy with the threshold condition; and
- instructions for executing the threshold action if the accumulated usage exceeds the threshold condition.

17. The non-transitory machine-readable storage medium of claim 15, wherein the secondary metering policy includes a plurality of rating rules including a rating condition and a rating factor, wherein each rating rule is based on a primary metering policy, the tangible and non-transitory machine-readable storage medium further comprising:
- instructions for determining a set of applicable consumed primary metering policies;
- instructions for selecting one of the applicable consumed primary metering policies as a basis for the secondary metering policy;
- instructions for selecting the rating rule based on the selected primary metering policy;
- instructions for measuring usage according to the rating factor of the selected rating rule; and
- instructions for charging the usage to the secondary metering policy.

18. The non-transitory machine-readable storage medium of claim 17, wherein each applicable consumed metering policy includes an indication of whether overage is allowed, and the instructions for selecting one of the applicable consumed metering policies comprises instructions for selecting a primary metering policy that allows overage.

* * * * *